Dec. 3, 1968  F. F. VYTLACIL  3,413,776
CYCLONE SEPARATOR
Filed Jan. 18, 1967
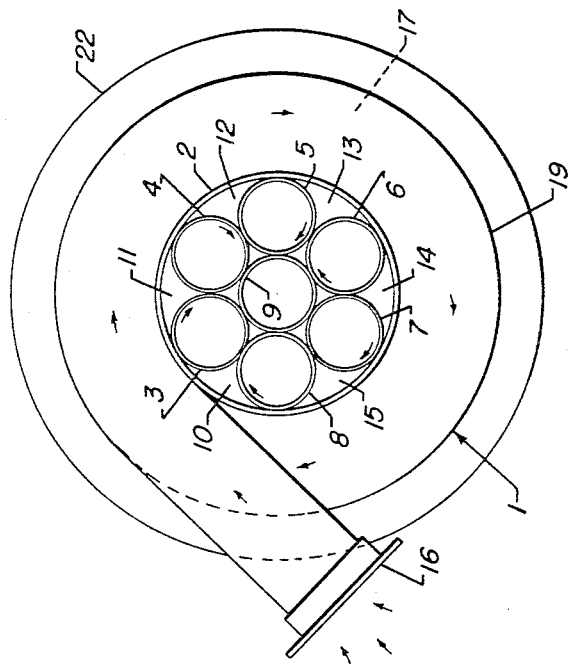
Figure I
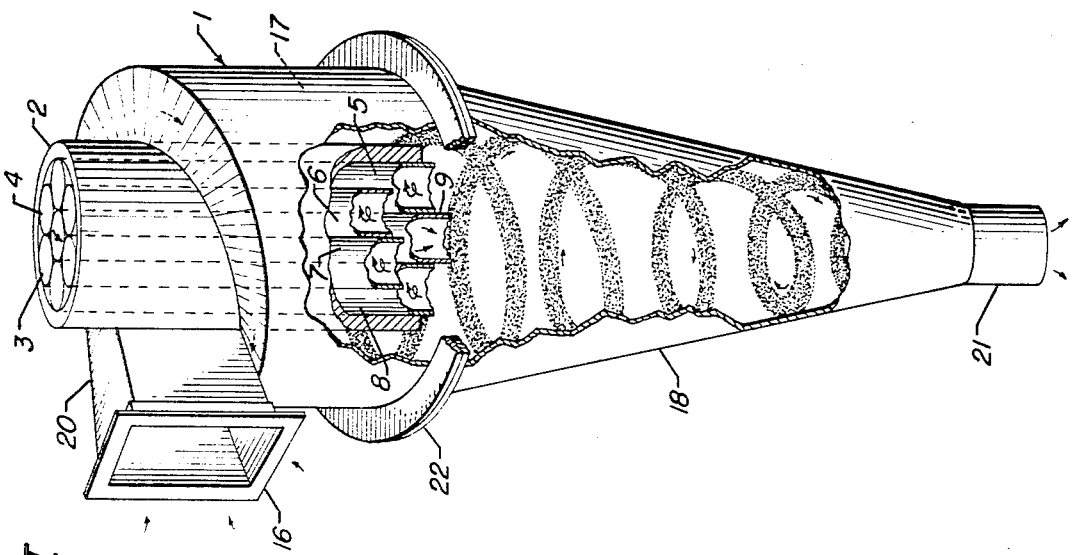
Figure II
INVENTOR:
Frank F. Vytlacil United States Patent Office 3,413,776
Patented Dec. 3, 1968

3,413,776
CYCLONE SEPARATOR
Frank F. Vytlacil, Cary, Ill., assignor to F. F. Vee Equipment Co., Inc., Chicago, Ill., a corporation of Illinois
Continuation-in-part of application Ser. No. 405,355, Oct. 21, 1964. This application Jan. 18, 1967, Ser. No. 622,840
6 Claims. (Cl. 55—1)

ABSTRACT OF THE DISCLOSURE

Cyclone apparatus having a bundle of circular or near circular tubes within the main gas outlet tube and method for improving cyclone performance wherein the inner spiral of outlet gas from the cyclone is divided into a plural number of gas spirals and each gas spiral is separately passed through the main gas outlet tube.

This application is a continuation-in-part of my copending application Ser. No. 405,355 filed Oct. 21, 1964 now abandoned.

This invention relates to an improved centrifugal type separator commonly called a cyclone. More specifically, this invention relates to a cyclone separation apparatus whose gas outlet comprises a bundle of small cross sectional area circular or near circular tubes having enhanced ability to separate a relatively dry solids-gaseous mixture.

Cyclone separators have been used for many years to separate mixtures by introducing the mixture of solids and gas at a sufficiently high velocity into the cyclone, which imparts a swirling motion to the mixture. Usually these cyclones function in that the gas and solids whirl in an outer spiral from the inlet until the gas forms a vertex, whereupon an inner spiral of gas rises from the vertex eventually passing through the gas outlet tube. The larger, heavier solid components of the mixture will move towards the outside of the outer spiral by virtue of the centrifugal forces while the smaller, lighter components remain closer towards the center of the outer spiral, thus achieving a separation between the solid components and the gas. Cyclones have been employed in gas-solid systems as for example, to separate dust from dust laden gas streams, fine catalyst from product streams in fluid catalytic cracking processing units, fine particles from milling and crushing operations, etc. Likewise, cyclones may be employed to separate solid-liquid systems. In many cases the recovered solids are useful products capable of being recombined with the main product and sold, as in the case of small food particles from food processing units. In other cases the recovered solids are capable of being re-used in the process and may be recycled back to the process such as in the case of catalysts. In still other cases, the cyclone prevents nuisances from factories by removing solid particles thereby discharging relatively clean gases.

It is generally desired to operate cyclones at the highest possible efficiency, namely to achieve the greatest degree of solid-gas separation. As the solid particles decrease in size and/or in density, it becomes more difficult to achieve a given degree of separation. The separation efficiency may be increased by increasing the rate of gas flow thereby increasing the centrifugal force in the body of the cyclone but this has the disadvantage of increasing the pressure drop across the cyclone. This increased pressure drop is undesirable in many cases since this generally entails more horsepower, larger motors and higher compression ratios in equipment such as blowers employed to move the solids laden gas.

For a given density solid and a given viscosity gas, a cyclone will generally remove all of the solid particles above a certain size and will remove decreasing percentages of those particles whose nominal size decreases below said certain size. Thus, for example, in a given operation a cyclone may remove 100% of those particles whose size exceeds 30 microns, 97–99% of those particles in the 20 to 30 micron size range, 83–97% of those particles in the 10 to 20 micron size range, 60–83% of those particles in the 5 to 10 micron size range and 0–60% of those particles smaller than 5 microns. If the velocity of gas is increased while maintaining everything else constant thereby increasing the pressure drop across the cyclone, the overall recovery of total particles will increase. It is, of course, desirable to remove the maximum amount of solid particles while in many instances it is not desirable to appreciably increase the pressure drop.

The prior art has recognized that the pressure drop across the cyclone can be reduced by destroying the inner spiral using means such as baffles in the gas outlet tube. Examples of this are shown in Patent No. 2,010,128 issued Aug. 6, 1935 to G. D. Arnold and U.S. Patent No. 2,936,043 issued May 10, 1960 to J. A. Armstrong et al. These baffles are inserted into the main gas outlet tube to destroy the inner spiral and thus reduce pressure drop. These baffles have been commonly utilized in the cyclone industry and have been called straightening vanes since they destroy the spiral motion of the inner spiral of gas and force the leaving gas to flow in a linear outward direction. These straightening vanes have the disadvantage of reducing cyclone efficiency since they destroy the spiral and prevent any additional solids-gas separation. It must be remembered that it is the spiraling or whirling motion which causes the solids to be separated from the gas and once the spiral is destroyed further separation is unlikely. Therefore, these prior art straightening vanes only attain the desired lowering of pressure drop at the expense of undesired poor separation.

The apparatus and process of the present invention are effective in simultaneously reducing pressure drop across a cyclone and increasing separation efficiency thereof. It has been found that by dividing the main gas outlet tube into a plural number of circular or near-circular conduits, the inner gas spiral is divided into a plural number of spirals each of which pass separately through the main gas outlet tube. This results in lowering cyclone pressure drop and also improves cyclone separation efficiency, a result heretofore unattainable.

It is an object of this invention to increase the solids recovery in a cyclone separator without increasing the pressure drop across the cyclone.

It is another object of this invention to modify the design of a cyclone separator so as to increase the removal of solids from a solids/gas stream.

It is a further object of this invention to modify the internal design of a cyclone to more efficently utilize the pressure drop energy to achieve higher solid-gas separation.

It is a more specific object of this invention to insert a bundle of small cross sectional area circular or near circular tubes into the gas outlet tube of a cyclone thereby inducing the formation of a number of smaller diameter spiral gas exit streams in place of one large diameter spiral gas exit stream.

It is another object of this invention to increase the effective outlet area of the main gas exit tube.

It is another more specific object of this invention to disclose an improved cyclone capable of enhanced removal of solids from a solids/gas stream without increasing the pressure drop.

It is a furthermore specific object of this invention to disclose an improved cyclone capable of enhanced removal of solids from a solids laden gas stream while reducing the pressure drop across the cyclone.

It is still another more specific object of this invention to establish a number of small diameter exit gas spirals thereby allowing a shorter distance for solid particles to travel before reaching the exit gas tube wall.

It is a still furthermore specific object of this invention to allow a portion of the exit gas from a cyclone to be recycled back into the cyclone body through one or several tubes located in or near the center of a bundle of tubes inserted into the main gas exit tube.

These and other objects will become more apparent in the light of the detailed description presented hereinafter.

FIGURE I shows a top view of a preferred embodiment of the present invention.

FIGURE II shows a side view of FIGURE I.

The heart of this invention lies in the insertion of a bundle of small cross sectional area circular or near circular tubes into the main gas exit tube of a cyclone separator thereby inducing the exit gas to change from a single inner spiral into a number of small inner spirals. I have found that the spiral movement of the gas is not destroyed by the insertion of the circular or near circular tube bundle but rather a number of smaller diameter gas spirals are created ahead of and in many of the tubes, especially those located on the outside of the bundle close to the main exit tube wall. I have also found that there is a recycle gas effect in those tubes located in the center of the bundle, that is, a portion of the exit gas leaving the outer tubes flows back down the inner tubes into the main cyclone body, although it is not necessary to recycle gas through the inner tubes to attain the advantageous results of this invention. The flow of this recycle gas may be regulated by a valve located in the inner tubes, the flow may be left undisturbed or the inner area may be entirely blocked off. The tubes may be shaped in various cross sectional shapes provided they are circular or near circular. It is important that the tubes be symmetrical and regular in order to promote the division of the inner spiral without destroying the whirling motion. This is the problem with straightening vanes since their irregular cross sectional shape destroys the whirling motion. By near circular I mean at least a 6-sided equal polygon and preferably one at least 8-sided. Functionally there should be enough smoothness to the tube to prevent destruction of the whirling motion. However, I prefer to use circular cross sectional tubes as this shape will least interfere with the whirling motion of the gas spirals in the exit tubes. Circular tubes are the least expensive also. The tubes should extend at least about 6 to 12 inches in length although they may be as long as the length of the main exit tube as shown in FIGURE II and in some cases even longer.

The number of tubes in the bundle may be varied according to convenience and economy. It is preferred that the number of tubes in the bundle be at least six. One preferable embodiment contains a total of 7 circular tubes in the bundle as shown in FIGURES I and II. This 7 tube embodiment is particularly suitable for compact arrangement of tubes with a minimum number of tubes. A thorough detailed description of the present invention is attained by reference to FIGURES I and II which are a top view and front view of the cycle respectively. Cyclone main body vessel 1 has an entrance conduit 16 into which the solids-gas stream is introduced. The solids laden gas passes through passage 17 whose outer wall 19 is the main body of the cyclone and whose inner wall 2 is the main gas exit tube, wherein the shape of the cyclone imparts a clockwise spiral motion to said gas thereby creating centrifugal forces which cause the heavier solid particles to be thrown to the outside of the spiral towards wall 19. The gas and solids are spiraled down through the passage 17 and into the conical section 18 of the cyclone connected to main body 1 by flange 22 and is called the outer spiral. The gas and solids continue to swirl in a clockwise direction until near the bottom of the conical section 18 where the gas forms a vertex and moves upward in the center of conical section 18 forming an inner spiral while the solids leave through exit conduit 21. When the swirling relatively solids free inner spiral gas approaches the inlet of exit tube 2, it divides approximately equally and flows through small cross sectional area tubes 3, 4, 5, 6, 7, and 8. The small spirals of gas are induced to form below the bottom of the exit tubes. It should be noted that the clockwise swirl of gas is continued in an upward direction ahead of and in each of the above small tubes. Additional separation of gas and solids occurs ahead of and in said small tubes and since the distance the solid particle has to travel to the outer surface of the small spirals is much shorter than if large exit spiral and tube 2 were only present (if the small tube bundle was not present) additional and enhanced separation occurs as the result of the presence of said small spirals and tubes. The direction and flow patterns of the gas is shown in FIGURES I and II by the curved arrows.

I have also found that there is a flow of gas in a downward direction through small tube 9 located in the center of the exit tube bundle. Although it is not exactly understood why this occurs, it is believed that the high velocity swirling gas streams dividing and leaving tubes 3 through 8 create a partial vacuum in the center of the cyclone body below the center of the tube bundle thus allowing some gas to recycle back to the cyclone body by flowing in a downward direction through tube 9. Whatever the reason may be, there is a recycle effect due to this particular arrangement of tubes in the main exit tube 3. The flow of gas in small tubes 3, 4, 5, 6, 7, 8 and 9 are further shown in FIGURE II by means of arrows which indicate the direction of flow.

The main exit tube 2 should extend above the inlet to the cyclone and should extend downward close to the start of the conical section of the cyclone. Although the exact length of the said tube is not critical, it is preferable that the length be close to that tube shown in FIGURE II. The tube may extend slightly into the conical section, may end at the start of the conical section or may end a short distance above the conical section. The suitable length of the tubes in the bundle may be from 3 times the diameter of main exit tube to about equal to the diameter of said exit tube. In some instances the length may be shorter in order to reduce the weight of said bundle or even longer than the main exit tube. The tubes in the center of the bundle may have the upper end flush with or slightly below the upper end of the outer tubes of the bundle.

The outer roof 20 of the cyclone may extend in a downward spiral shape thus imparting a downward motion to the inlet gas or said roof may be flat across the top. In general the relative lengths shown in FIGURES I and II are to scale and if a cyclone is scaled up from the drawing dimensions it will perform satisfactorily. However, it is not intended to limit the scope of this invention to those relative lengths in FIGURES I and II and equivalent designs not relating to said heart of this invention are intended to be included within the scope of this invention.

The tube bundle may contain different cross sectional sized tubes or said bundle may contain a different number of cross sectional area tubes. Thus for example, more or less than 7 tubes may be employed. In general the degree of improvement in solids-gas separation will increase as the diameter of the small tubes decreases. Likewise, circular cross section tubes of different diameter may be employed to achieve a compact arrangement of tubes within a given tube bundle. The space between the tubes in the bundle as shown in FIGURE I as 10, 11, 12, 13, 14 and 15 may be blocked off or left open. It is generally convenient to block off said space near or at the top of the tube bundle if it is desired to block it off at all. However, if too much area is blocked off the outlet area will be too small and higher pressure drop may occur. In general, the proportion of blocked off area should not exceed 40% of the total exit area.

The tube bundle may be supported on the top roof of the cyclone and thereupon inserted into the main exit tube from above, the tubes may be individually tack welded to the main exit tube and to each other, the tube bundle may be supported from the main body of the cyclone, the tube bundle may be friction fitted into the main exit tube or may be supported in any other mechanically equivalent manner. One particular advantage of my invention is that said tube bundle may be readily adapted to be inserted into existing cyclones, even in the field without elaborate mechanical revamping. This revamping may be easily done on operating cyclones to improve their performace. The tube bundle may also be fabricated along with a new cyclone as an integral part thereof: The simplicity of the construction of the tube bundle makes it readily adaptable in all kinds of cyclones performing all kinds of service. The material of construction of the tube bundle will be dependent upon the service that the cyclone is operated in. Thus in high temperature operation carbon steel or stainless steel may be employed. As a general rule of thumb the material of construction for the main body of the cyclone is suitable for the tube bundle also. However, the tube bundle may be constructed of any material particularly suitable for a given application, as for example, where the suitable weight of the tube bundle is limited, the material may be made out of plastic or thin walled metal.

I have also discovered that when the space between the tubes in the tube bundle is not blocked off, then for a given gas flow rate and solids concentration through a given cyclone, there is a significant decrease in pressure drop across said cyclone upon insertion of the tube bundle into the main exit tube. Thus in many applications, the improved cyclone not only will remove a greater amount of solids but will also decrease the pressure drop across said cyclone. This is due to the more efficient utilization of hte pressure drop energy to separate the solids and gases by the improved cyclone design and more effective usage of the cross sectional area in the main gas outlet tube.

The amount of decrease in pressure drop will be dependent upon the gas flow rate and the solids concentration with said amount becoming more noticeable at higher gas flow rates. It is expected that there may be as much as a 20% reduction in pressure drop.

The gas flowing outwardly through the tube bundle is whirling in a clockwise direction for the embodiment shown in the drawing. If the tubes in the bundle were of irregular cross section they would function as straightening vanes and thus destroy the whirling motion. The circular or near circular tube bundle permits the division of the inner spiral without destroying the spiraling motion. It is important that the whirling motion not be destroyed since by preserving this whirling motion improved cyclone efficiency is attained. In all likelihood the gas spirals passing through the tube bundle looks more like a helix than a spiral and by using the word spiral it is not intended to exclude helix flow.

*Example I*

A cyclone whose inlet dimensions are 4½ x 4 inches and whose length is 12 inches, whose main exit tube has a diameter of 4⅞ inches, whose conical section length is 12¾ inches having an angle of 20° from the vertical, and having a helical top was constructed out of carbon steel. The helical top is an involute downwardly extending having a pitch of 6 inches. A blower driven by a 1 H.P. motor is connected to said cyclone by means of a 4 inch circular duct. Just before the entrance to the cyclone there is a transition piece inserted in the duct which changes the duct from a 4 inch circular duct to a 4 x 4½ rectangular duct. The motor is connected to the blower by a belt whose pulleys are constructed to rotate the blower at a speed of about 4140 r.p.m. A slot is cut into the ductwork in the circular portion and covered with a rubber sheet which is clamped to the ductwork. A Pitot tube is inserted into the ductwork through the rubber sheet to measure the flowrate of gas. A solids feeder is constructed on the suction side of blower to insure a steady rate of addition of solids to the cyclone. A pressure indicating device is installed at the entrance to the cyclone. A damper is installed on the blower suction between the atmosphere and the blower to regulate the flow of gas, which is air.

The motor is turned on and the damper is adjusted to give a flow rate of 342 cubic feet per minute of air through the blower. The solids feeder is adjusted to introduce solids at a rate of about 200 grams per minute. In this test fine carborundum grits whose size range is from about 2 microns to about 100 microns is used as the solids phase. A glass jar is attached to the solids outlet at the bottom of the conical section to collect the separated solids. With the flow rates lined out at the above rates, the measured pressure drop across the cyclone is 7.5 inches of water.

The damper is partially closed until the gas flow rate is reduced to 273 cubic feet per minute while the solids rate is reduced to 150 grams per minute. The pressure drop across the cyclone is 4.9 inches of water.

The damper if further closed until the gas flow rate is reduced to 225 cubic feet per minute while the solids rate is reduced to 100 grams per minute. The pressure drop across the cyclone is 3.2 inches of water.

The damper is opened until the gas flow rate is increased to 324 cubic feet per minute while the solids rate is increased to 150 grams per minute. A representative sample of the exit gas from the cyclone is taken and the solids contained therein are placed on a microscope slide. These solids are examined under a microscope at a magnification of 60× and 150× and the number of particles within the size range from 10 microns to 35 microns by a traverse of the entire slide is 50. There are 7 particles within the size range from 30 to 35 microns. The pressure drop across the cyclone is 6.7 inches of water.

*Example II*

A bundle of 7 tubes arranged in the same manner as shown in FIGURES I and II whose diameter is 1⅝ inches and whose length is 12 inches are inserted to the main gas exit tube in the cyclone used in Example I. The dimensions of the tube bundle are such that the bundle is supported by a friction fit within said main exit tube and the space between such tube is not blocked off. The motor is turned on and the damper is adjusted to give a flow rate of 342 cubic feet per minute of air through the blower. The solids feeder is adjusted to introduce solids at a rate of about 200 grams per minute. With the rates lined out, the measured pressure drop across the cyclone is 6.6 inches of water.

The damper is partially closed until the gas flow rate is reduced to 273 cubic feet per minute while the solids rate is reduced to 150 grams per minute. The pressure drop across the cyclone is 4.1 inches of water.

The damper is further closed until the gas flow rate is reduced to 225 cubic feet per minute while the solids rate is reduced to 100 grams per minute. The pressure drop across the cyclone is 2.5 inches of water.

The damper is opened until the gas flow rate is increased to 324 cubic feet per minute while the solids rate is increased to 150 grams per minute. A representative sample of the exit gas obtained in the same manner as in Example I is taken and the solids contained therein are placed on a microscope slide. These solids are examined under the microscope at a magnification of 60× and 150× and the number of particles within the size range from 10 to 35 microns by a traverse of the entire slide is 17. There are no particles within the size range from 30 to 35 microns. The pressure drop across the cyclone is 5.8 inches of water.

In comparing the results of Example I without the tube bundle and Example II with the tube bundle, it is noted that the pressure drop at constant gas rates is lower in Example II and also the removal of solids from the gas has increased in Example II. It is further noted that the center tube in the tube bundle has no exit gas leaving in an upward direction but rather is pulling a portion of the exit gas and fine solids back down said center tube and recycling said portion back into the cyclone for additional separation of solids. It is still further noted that each of the outer tubes in the tube bundle has spirally upward flowing gas within the cross sectional area of said outer tube.

The damper was opened and gas is passed through the cyclone. A thin hollow metallic probe connected at one end to a manometer by means of a rubber tubing is inserted about 1 inch into one of the outer 1⅝ inch tubes. The probe was tipped so that the opening was facing counterclockwise or toward the direction of cyclone clockwise gas flow. The probe was then tipped in the opposite direction at the same location in the 1⅝ inch tube so that the opening was facing clockwise gas flow. Comparison of the manometer readings show that when the probe is facing the counterclockwise direction (toward the direction of gas flow) the manometer reading is several times higher than when the probe is facing the clockwise direction (away from the direction of gas flow). This was repeated for all of the outer six 1⅝ inch tubes with the same result. This clearly shows that the gas is whirling in each of the 7 tube arrangement shown in FIGURES I and II.

Rags were stuffed into the center tube and the area between the center tube and the outer tubes in the tube bundle to block off any flow of gas therethrough. The cyclone continues to function as before with six whirling spirals passing through the outer six tubes. There is no increased pressure drop. When the solids outlet conduit is opened to the atmosphere there is a tendency for air to flow up the solids outlet conduit and into the cyclone. These results show that it is unnecessary to maintain a countercurrent flow of gas in the center tube of the tube bundle in order to attain the improved results of the present invention.

*Example III*

The same cyclone apparatus described in Example I was again used except 10 small diameter circular tubes (9 of 1 inch inner diameter and of ⅞ inch inner diameter) are placed at the outer periphery of the main exit tube and a single 2¼ inch inner diameter inner tube is placed in the center of the main gas exit tube. Thus a tube bundle of 11 circular tubes is employed in this example. The motor is turned on and the damper adjusted to allow air to flow through the cyclone at a rate of about 342 cubic feet per minute. The hollow probe described in Example II is inserted into one of the outer 1 inch tubes and the opening is faced toward the direction of gas flow (facing counterclockwise). The manometer reads +3.0 inches of water. The probe is then faced away from the direction of gas flow at the same location in the same 1 inch tube (facing clockwise) and the resulting manometer reading is +0.6 inch of water. This clearly shows the gas is whirling in this tube. Similar results are obtained from the other nine outer tubes. The probe is placed in the center 2¼ inch larger circular tube and the manometer reading is −0.5 inch of water showing a vacuum driving force to permit gas to flow countercurrent in the center tube to the direction of gas flow in the outer 10 tubes.

I claim as my invention:

1. A method for improving the performance of a cyclone separator having a solids laden gas tangential intake, a cylinderical outer casing, a frusto conical section, a solids outlet conduit and a relatively solids free gas outlet member which comprises:

introducing solids laden gas into the intake;

whirling the solids laden gas outside of and around the outer periphery of the outlet member and within the inner surface of the casing;

whirling the solids and gas within the inner surface of the frusto conical section in a downward conical spiral and force the gas to create a vertex;

removing solids through the outlet conduit below the vertex;

dividing the gas rising from the vertex through the center portion of the frusto conical section into a plural number of whirling gas spirals; and passing each of the whirling gas spirals out of the cyclone through a separate tube contained within said outlet member, said whirling gas spirals being substantially coextensive with each other in the cyclone, the cylinderical axis of each spiral being spaced apart from each other and said axis being substantially parallel to the axis being substantially parallel to the axis of each other spiral and to the axis of the outlet member.

2. The method of claim 1 further characterized in that a portion of the gas passing out of the cyclone is recycled back into the cylinderical casing of the cyclone through a center tube contained with the outlet member and substantially coaxial thereto said recycled gas portion passing down through said center tube without the aid of any outside mechanical means.

3. The method of claim 2 further characterized in that the number of spirals passing out of the cyclone is six, and the six spirals spaced symmetrically around the center tube, the diameter of the spirals and center tube being approximately ⅓ of the diameter of the outlet member.

4. A cyclone separation apparatus to separate solids from a solids laden gas which comprises:

a cylinderical outer casing having a substantially vertical axis and having a frusto conical section depending from and sealingly attached to its lower end, the base of the frusto conical section being disposed above the apex of the frusto conical section;

a tangential solids laden gas intake adjacent to the upper end of the casing;

an inner cylinderical member substantially coaxial with said outer casing and inserted into the casing at its upper end, projecting from a point above the intake downwardly into the casing to a point below the intake and near the base of said frusto conical section, the outer periphery of said inner member being sealed to said casing and through which inner member relatively solids free gas is discharged;

a solids outlet conduit depending from and fluidly communicating with the lower end of the frusto conical section; and means within said inner member to divide the discharging gas into a plural number of whirling gas spirals and to separately discharge said whirling gas spirals through said inner member, each gas spiral being substantially coextensive with each of the other gas spirals, each gas spiral having a vertically extending central axis, said axis of each gas spiral being spaced apart from and substantially parallel to the vertically extending axis of each of the other gas spirals and said inner member and said axis contained within said inner member having a length of from one to three times the diameter of said inner member.

5. The apparatus of claim 4 further characterized in that said means within the inner member comprises a bundle of circular cross sectional tubes, each of the tubes of said bundle through which gas is discharged being substantially coextensive with each other, the cylinderical axis of each of said tubes being spaced apart from one another and parallel to each other and parallel to the cylinderical axis of said inner member, the minimum tube diameter in the bundle being at least about 18% of the diameter of said inner member, the exterior surface of each tube directly or indirectly contacting the exterior surface of at least one other tube of said bundle, said tubes being disposed substantially within said inner member, the number of tubes through which gas is discharged being at least six and blocking off means located near the top of said tubes to block off at least a portion of the space between the tubes in the bundle, the proportion of cross sectional area blocked off not to exceed 40% of the total cross sectional area of said inner member.

6. The apparatus of claim 5 further characterized in that the tubes of said bundle have substantially equal diameters, the number of tubes in said bundle is seven and the total cross sectional area of the tube bundle is about 7/9 of the cross sectional area of said inner member.

References Cited

UNITED STATES PATENTS

| | | | |
|---|---|---|---|
| 1,719,119 | 7/1929 | McKain | 209—144 |
| 1,930,806 | 10/1933 | Horne et al. | 55—349 |
| 1,940,196 | 12/1933 | Wagner | 55—349 X |
| 2,005,305 | 6/1935 | Wagner | 55—343 |
| 2,010,128 | 8/1935 | Arnold | 55—399 |
| 2,439,850 | 4/1948 | Heller | 55—1 |
| 2,553,175 | 5/1951 | Davenport et al. | 55—343 |
| 2,569,909 | 10/1951 | Umney | 55—396 |
| 2,659,451 | 11/1953 | Baird | 55—347 |
| 2,788,087 | 4/1957 | Lenehan | 55—392 X |
| 2,936,043 | 5/1960 | Armstrong et al. | 55—457 X |
| 2,963,109 | 12/1960 | Brookman et al. | 55—349 X |
| 3,104,961 | 9/1963 | Westlin | 55—428 X |

FOREIGN PATENTS

| | | |
|---|---|---|
| 247,339 | 5/1912 | Germany. |
| 145,680 | 1/1961 | U.S.S.R. |

HARRY B. THORNTON, *Primary Examiner.*

DENNIS E. TALBOT, JR., *Assistant Examiner.*